No. 744,600. PATENTED NOV. 17, 1903.
O. G. OGDEN.
FAN ATTACHMENT FOR SEWING MACHINES.
APPLICATION FILED MAY 15, 1903.

NO MODEL.

WITNESSES:
Fred P. Bradford
Perry B. Turpin

INVENTOR
Otto G. Ogden
BY Munn & Co.
ATTORNEYS.

No. 744,600. Patented November 17, 1903.

UNITED STATES PATENT OFFICE.

OTTO G. OGDEN, OF LOUISVILLE, KENTUCKY, ASSIGNOR OF TWO-THIRDS TO JOHN NICHOLSON AND EDWARD J. HACKETT, OF NEW ALBANY, INDIANA.

FAN ATTACHMENT FOR SEWING-MACHINES.

SPECIFICATION forming part of Letters Patent No. 744,600, dated November 17, 1903.

Application filed May 15, 1903. Serial No. 157,256. (No model.)

*To all whom it may concern:*

Be it known that I, OTTO G. OGDEN, a citizen of the United States, residing at Louisville, in the county of Jefferson and State of Kentucky, have made certain new and useful Improvements in Fan Attachments for Sewing-Machines, of which the following is a specification.

My invention is an improvement in fan attachments for sewing-machines, and has for an object to provide a novel construction by which the fan attachment can be readily connected with and disconnected from the fly-wheel of the machine and to so construct the fan-supporting devices and the connecting means for securing the same to the fly-wheel that said connecting means may be adjusted to one side or the other of the fan-wheel and can be turned in the knockdown position of the parts into a plane with the hub or disk of the fan-wheel to secure a compact arrangement of the parts for shipment or storage; and the invention consists in certain novel constructions and combinations of parts hereinafter described and claimed.

Figure 1:
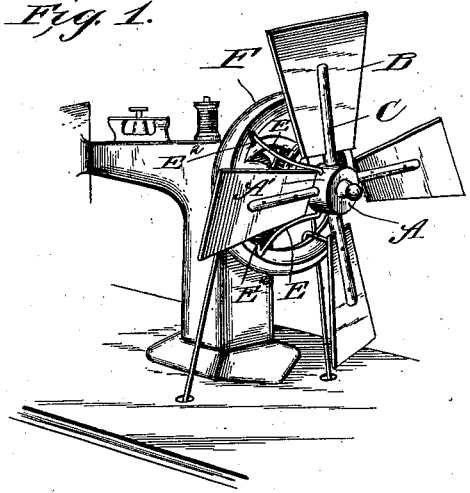
Figure 2:
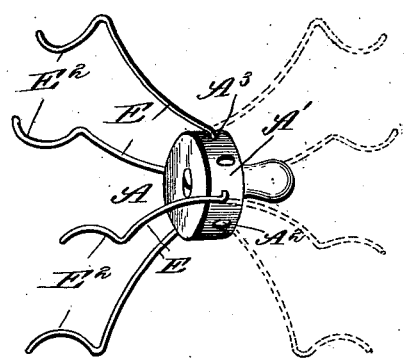
Figure 3:
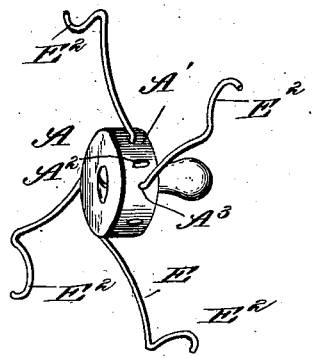
Figure 4:
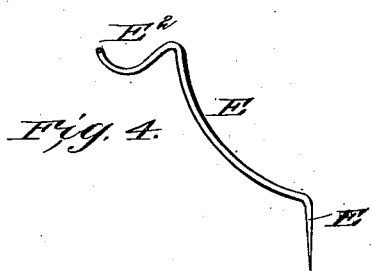
Figure 5:
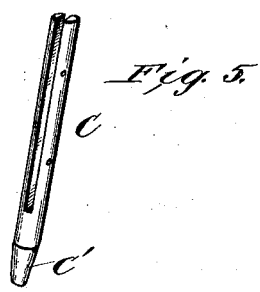

In the drawings, Figure 1 is a perspective view of the invention as in use. Fig. 2 is a detail perspective view of the hub or disk with the connecting-arms in place and adjusted in full lines to project laterally from one side of the hub and in dotted lines to project from the opposite side of the hub. Fig. 3 is a detail perspective view of the hub and connecting-arms with the latter adjusted into the plane of the hub. Fig. 4 is a detail perspective view of one of the connecting spring-arms, and Fig. 5 is a detail perspective view of one of the fan-shanks.

In carrying out my invention I provide in connection with the hub A the blades B and their shanks C, connecting-rods E for securing the hub detachably in connection with the fly-wheel F of the sewing-machine, and as this fly-wheel F is sometimes turned in one direction and sometimes in the opposite direction in different machines I provide for reversing the connecting-arms E, so they may be made to project from one side of the hub A, as shown in full lines, Fig. 2, and in Fig. 1, or they may be adjusted to project from the opposite side of the said hub A, as indicated in dotted lines, Fig. 2, so the attachment can be connected to properly operate whether the fly-wheel F be revolved in one direction or the other. I also provide for connecting the arms E with the hub A, so the said arms can in the knockdown position of the parts be turned into the position shown in Fig. 3, in which they lie in a common plane with the hub or disk A. In securing these results I construct the hub A in the form of a disk provided in its rim A' with sockets $A^2$ for the shanks of the fan-blades and also between the said sockets $A^2$ with sockets $A^3$ for the shanks E' of the connecting-rods E, so that the said rods E are pivoted in connection with the hub A in a line radial to the center of said hub and its center of movement, so that the connecting-arms E may be turned to project to one side of the hub A or to the opposite side, as will be understood from Fig. 2. It will also be noticed that the arms E may be turned into the plane of the hub A', as shown in Fig. 3. At their outer ends the arms E are provided with clasp portions $E^2$, which embrace the inner side of the rim of the wheel F, as shown in Fig. 1, and operate to detachably secure the hub A firmly in connection with the said fly-wheel F. It will also be noticed that by connecting the arms E with the hub A by means of shanks E' on the arms E fitting in the sockets $A^3$ in the rim of the hub A, I am able to support the ends of the arms E opposite the clasps $E^2$ at a point more remote from the axis of the hub A in any given size of hub than if the arms were secured to the side face of the hub, so that I am able to secure a stronger and better action of the connecting-rods E in their engagement with the fly-wheel, as will be understood from Figs. 1 and 2 of the drawings.

The blades B may be made of pasteboard or other suitable material having the shanks C, whose ends C' may fit in the sockets $A^2$ and may be adjusted therein to suit the fan to the speed of the fly-wheel F, some operators driving the machine faster than others, as is well understood.

By my invention it will be noticed I provide a fan attachment which can be readily connected with the fly-wheel and one in which the connecting spring-arms E, which may preferably be of resilient wire, can be adjusted into the plane of the hub or to project from one side or the other of said hub, as occasion may require, and in which the ends of said arms in connection with the hub of the fan-wheel are arranged as far as possible from the center of said hub by fitting the shanks E' of the said connecting-arms in sockets formed in the outer rim of the hub A', as will be understood from Figs. 2 and 3 of the drawings.

Having thus described my invention, what I claim as new, and desire to secure by Letters Patent, is—

1. The herein-described improvement in fan attachments, consisting of the hub provided in its rim with sockets for the shanks of the fan-blades and between said sockets with sockets for the shanks of the connecting-arms, the fan-blades and their shanks held in the sockets of the hub and spring connecting-arms having the clasps at their outer ends to engage a fly-wheel of a machine and provided at their inner ends with shanks movably fitted in the rim-sockets of the wheel-hub whereby the said arms are connected with the hub at a point remote from the center thereof, and can be adjusted into the plane of said hub or to project from one side or the other of said hub, substantially as and for the purposes set forth.

2. The combination in a fan attachment of the hub provided in its rim with sockets for the shanks of the fan-blades and with sockets for the shanks of the connecting-arms, the fan-blades having their shanks fitting in the rim-sockets of the hub, and the spring connecting-arms adapted at their outer ends for engagement with a fly-wheel of a sewing-machine and having at their inner ends shanks fitting in the sockets in the rim of the hub, the said arms being adjustable into the plane of the hub or to project to one side or the other of said hub, substantially as set forth.

OTTO G. OGDEN.

Witnesses:
SOLON C. KEMON,
PERRY B. TURPIN.